Oct. 30, 1928.
A. A. RECTOR
DRAWBAR
Filed April 29, 1926
1,689,454
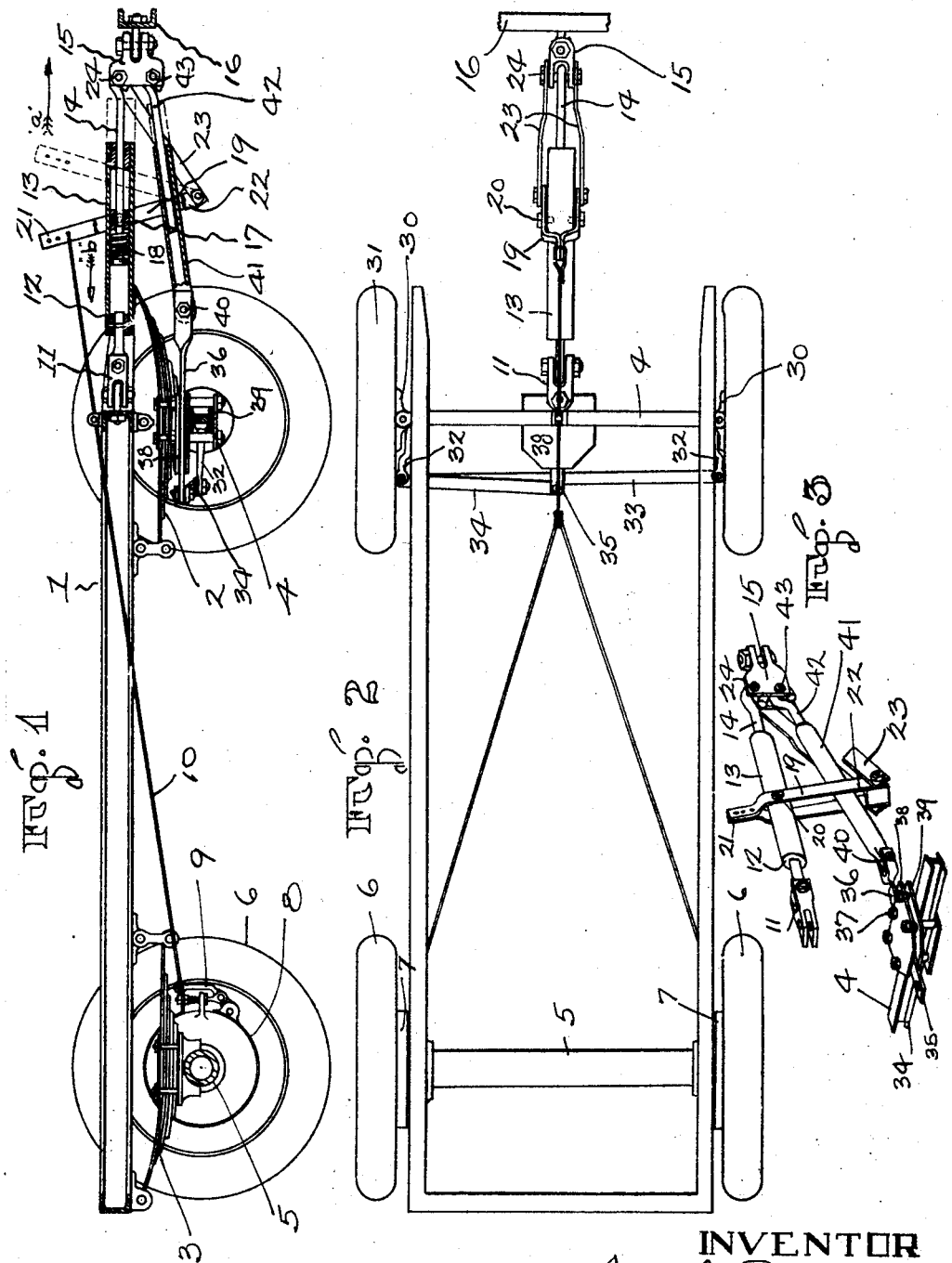
INVENTOR
ADAM A. RECTOR
BY Lincoln Johnson
ATTY.

Patented Oct. 30, 1928.

1,689,454

UNITED STATES PATENT OFFICE.

ADAM A. RECTOR, OF SAN FRANCISCO, CALIFORNIA, ASSIGNOR TO RECTOBAR MANUFACTURING COMPANY, OF RENO, NEVADA, A TRUST ASSOCIATION.

DRAWBAR.

Application filed April 29, 1926. Serial No. 105,340.

This invention relates particularly to a draw bar to connect a pair of independent vehicles for towing purposes.

An object of the invention is to provide a draw bar to connect a towing vehicle to a towed vehicle, which said draw bar is of a telescopic construction, and is provided with means thereon to actuate a braking system on the towed vehicle.

A further object of the invention is to provide a draw bar having means thereon actuated by uncontrolled movement of the towed vehicle to apply the brakes to the said towed vehicle, in combination with a telescopic rod connecting the towing vehicle to the towed vehicle to control the wheel steering apparatus on the towed vehicle, and to operate the same in unison with the draw bar. Other objects and advantages will appear as this description progresses.

In this specification and the annexed drawings, the invention is illustrated in the form considered to be the best, but it is to be understood that the invention is not limited to such form, because it may be embodied in other forms, and it is also to be understood that in and by the claims following the description, it is desired to cover the invention in whatsoever form it may be embodied within the scope of said claims.

In the accompanying one sheet of drawings—

Fig. 1 represents a vertical section through a trailer having a draw bar and steering apparatus mounted thereon constructed in accordance with my invention.

Fig. 2 is a plan view of Fig. 1.

Fig. 3 is a perspective view of the draw bar and steering bar apparatus detached from connection with the vehicles, except that the connection with the axle of the towed vehicle is shown.

In detail, the construction illustrated in the drawings comprises a trailer or towed vehicle, consisting of a frame 1, connected in a conventional manner by the front and rear springs 2 and 3, respectively, to the front and rear axles 4 and 5, respectively. The rear axle 5 has traction wheels 6 rotatably mounted thereon, each of which are provided with brake drums 7 thereon around which the split brake bands 8 are mounted. The individual brake bands 8 are of the conventional type, in which one end of the split brake band is held in a relatively fixed position adjacent the brake drum 7 while the opposite end of the brake band is provided with a link lever 9 pivotally connected thereto for the purpose of drawing the brake band into frictional contact with the brake drum. The brake lever 9 is operated to put the brakes on by a control rod 10, leading to an operating bar 19, to be hereinafter described, the brakes being normally off but being put on by a forward movement of the rod 10 caused by a backward movement of a bar 14.

The middle of the front end of the trailer frame 1 is provided with a universal coupling 11 thereon, connected at the free end thereof to the closed end 12 of a hollow casing 13, forming one half of a draw-bar. An end of a plunger 14 is reciprocatingly mounted within the casing 13. The free end of the plunger 14 is connected to a universal coupling frame 15 that is pivotally connected to a tractor or towing vehicle 16. The draw-bar is thus comprised of the related casing 13 and plunger 14 connected together in lengthwise sliding engagement. A stop collar 17 is confined within the interior of the casing 13 to limit the forward pulling movement of the plunger 14, while movement of the plunger 14 in the reverse direction is limited by the closed end 12 of the casing 13. An expansion spring 18 is interposed between the end of the plunger 14 and stop collar 17.

A forked bar 19 is pivoted at 20, intermediate its ends, to opposite sides of the casing 13. The upper end 21 of the bar 19 has the free end of the brake control rod 10 secured thereto. The lower end 22 of the bar 19 is pivotally connected to one end of the link 23, that is pivoted at its opposite end around the pivot pin 24 that secures the free end of the plunger 14 to the universal coupling frame 15. When the towing vehicle 16 moves in a forward direction indicated by the arrow "$a$", the draw bar members 13 and 14 transmit the pulling power directly to the trailer 1 and both vehicles are moved in unison. Should the forward speed of the trailer become greater than that of the towing vehicle, the said trailer would gradually approach the rear end of the towing vehicle, and thereby cause the draw bar casing 13 to move forwardly relative to the plunger 14. The forward movement of the draw bar casing 13 causes a pivotal movement of the forked bar 19, which, in turn, automatically actuates the trailer braking mechanism and causing the brakes thereon to be applied to slow the speed of the trailer to a speed equal to or less than that of the towing vehicle. As soon as the speed of the trailer is reduced below that of the towing vehicle, the draw bar casing 13 returns to its normal position and automatically releases the brakes from the trailer wheels. In all forward movements of the trailer by the towing vehicle, the brakes on the trailer are not actuated, but, when the forward speed of the trailer is uncontrolled, and the trailer tends to advance onto the towing vehicle, the operation of the draw bar casing is such that the brakes on the trailer are automatically applied to control the speed thereof.

The opposite ends of the front axle 4 are provided with wheel spindles 30 pivotally mounted thereon on which the front traction wheels 31 are journaled. Each of the opposite spindles 30 have projections 32 thereon connected together by a cross bar 33. A drag link 34 is pivoted at one end to one of the spindle projections 32, while the free end of said drag link 34 is pivoted, at 35, to the rear end of a steering arm 36, pivoted at 37, between spaced guide plates 38 and 39 that are mounted centrally between the ends of the front axle 4. Swinging movement of the steering bar 36 is transmitted through the drag link 34 and cross bar 33 to the respective steering wheel spindles to cause said wheels to turn in a direction corresponding to the direction of movement of the steering bar 36.

The front end of the steering bar 36 is pivotally connected at 40 to a tube 41 which has one end of a rod 42 telescopically mounted therein. The tube 41 and rod 42 form a telescopic steering rod to operate the steering bar 36. The projecting end of the rod 42 is pivoted at 43 to the universal coupling frame 15 on the tractor 16. The steering rods 41 and 42 extend through the forked bar 19, that is pivoted onto the draw bar casing 13. Thus, when the tractor 16 turns either to the right or to the left, a corresponding turning movement is transmitted to the telescoping members 41 and 42, which in turn cause the steering bar 36 to be swung and the steering wheels 31 on the trailer turned accordingly to follow in the same direction as that of the tractor 16. The forked bar 19 that connects the draw bar casing 13 to the steering rods 41 and 42 causes both the draw bar and steering rods to be moved in unison.

Having thus described this invention, what I now claim and desire to secure by Letters Patent is:

1. A draw bar and steering apparatus for vehicles comprising, in combination, a pair of slidably related bars each having the free ends thereof universally connected to a pair of independent vehicles, said bars having a limited sliding movement relative to each other; a steering apparatus on one of the vehicles; means to telescopically connect said steering apparatus to the other of the vehicles; and a lever pivoted at one end of the slidably related bars and having the telescopic means guided therein and pivoted at its other end to the other of the vehicles, to hold said bars and means together in all lateral movements.

2. A draw bar and steering apparatus for vehicles comprising in combination a pair of slidably connected members each having means on the free ends thereof to connect a pair of independent vehicles together; a steering apparatus on one of the vehicles, means to connect said steering apparatus to the other vehicle; and means to automatically operate the brakes on one of said vehicles, said means being pivotally connected to one end of the draw bar actuated by axial sliding movement thereof, the same means having the steering apparatus guided therein and being pivotally connected at its other end to the other of the vehicles, to hold said members and means together in all lateral movement.

3. A draw bar and steering apparatus for vehicles comprising in combination a pair of slidably connected members each having means on the free ends thereof to connect a pair of independent vehicles together; a steering apparatus on one of the vehicles; means to telescopically connect said steering apparatus to the other vehicle; and means to hold said sliding members and telescopic means together in all lateral movements, said last mentioned means comprising a lever pivoted at one end to one of the slidably connected members and having the telescopic connecting means slidably guided therein and pivoted at its outer end to the other of the vehicles.

4. A draw bar and steering apparatus for vehicles comprising in combination a pair of slidably connected members each having means on the free ends thereof to connect a pair of independent vehicles together; a steering apparatus on one of the vehicles; means to telescopically connect said steering apparatus to the other vehicle; and means to hold said sliding members and telescopic means together in all lateral movements, said latter means being pivoted at one end of the slidably connected members and having the telescopic means guided therein and pivoted at its other end to the other of the vehicles.

In testimony whereof, I have hereunto set my hand at San Francisco, California, this 20th day of April 1926.

ADAM A. RECTOR.